United States Patent

[11] 3,590,722

| [72] | Inventor | Samuel Leptrone<br>1737 Robinhood Lane, Clearwater, Fla. 33516 |
|---|---|---|
| [21] | Appl. No. | 831,290 |
| [22] | Filed | June 9, 1969 |
| [45] | Patented | July 6, 1971 |

[54] FLAVOR INJECTOR DEVICE
1 Claim, 3 Drawing Figs.

[52] U.S. Cl. .................................................. 99/257, 128/231
[51] Int. Cl. ............................................................. A23b 1/16
[50] Field of Search .................................................. 99/256–257; 222/191—192; 128/217, 231—232

[56] References Cited
UNITED STATES PATENTS

| 921,980 | 5/1909 | Hackmann et al. | 99/256 |
| 2,511,469 | 6/1950 | Hawks | 128/232 |
| 2,659,369 | 11/1953 | Lipman | 128/217 |
| 2,887,035 | 5/1959 | De Seversky | 99/256 X |
| 3,016,895 | 1/1962 | Sein | 128/217 |
| 3,124,171 | 3/1964 | Mitchell | 128/232 UX |
| 3,328,171 | 6/1967 | Flaherty | 99/256 UX |
| 3,331,537 | 7/1967 | Benedict | 128/231 X |
| 3,410,457 | 11/1968 | Brown | 99/257 |

*Primary Examiner*—Walter A. Scheel
*Assistant Examiner*—Arthur O. Henderson
*Attorney*—Watts, Hoffmann, Fisher and Heinke

ABSTRACT: A hollow tapered needle is adapted to pierce a body of food and inject flavoring material thereinto as the needle is withdrawn, a deformably bulb on the stock to the needle contains a liquid flavoring material which is forced through the needle as the bulb is squeezed by the palm of a person's hand, gripping abutments projecting from opposite sides of the stock.

PATENTED JUL 6 1971 3,590,722

INVENTOR
SAMUEL LEPTRONE
BY
Watts, Hoffmann, Fisher & Heinke
ATTORNEYS

FLAVOR INJECTOR DEVICE

BACKGROUND OF THE INVENTION

The present invention relates to an improved flavor injector device of the type employed for injecting flavoring material inside a food body, such as a meat roast. Injector devices of this type have been proposed heretofore but they are difficult and inconvenient to use.

An object of the present invention is the provision of an improved flavor injector device which comprises an elongated hollow needle having a hand grip structure at the stock end which includes finger grips extending from opposite sides of the needle and a compressible bulb of flavoring material arranged to be cupped in the palm of the hand engaging the finger grips so that flavor material may be squeezed from the bulb and through the needle as the needle is withdrawn from a body of food merely by increasing the gripping pressure of the hand.

Other objects and advantages of the invention will be apparent from the following description of a preferred form thereof, reference being made to the accompanying drawings wherein.

Figure 1:
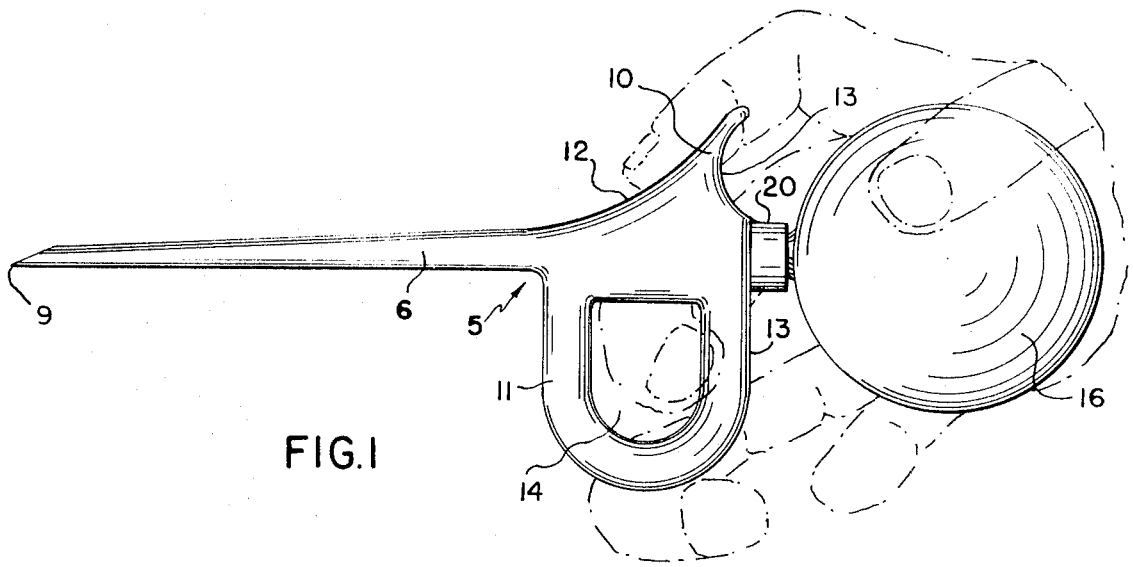
FIG. 1 is a side elevational view of a flavor injector embodying the invention.
Figure 2:
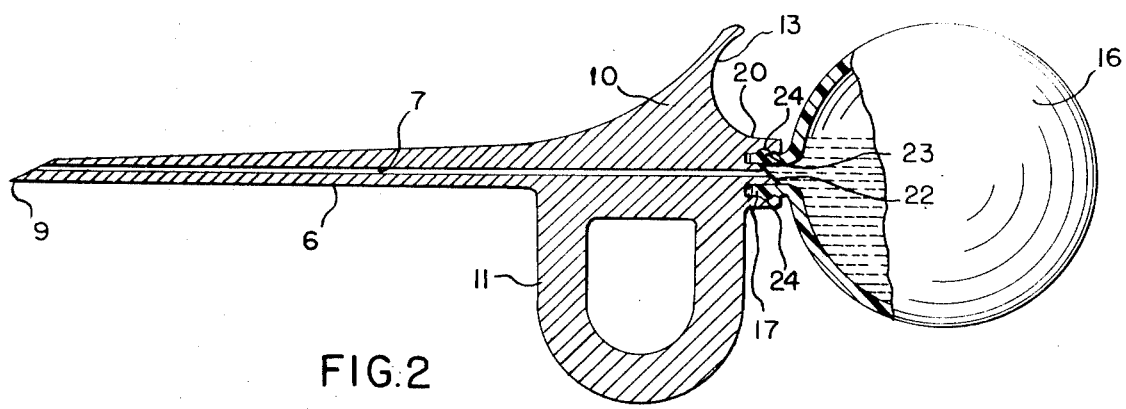
FIG. 2 is a broken away sectional view of the injector shown in FIG. 1.
Figure 3:
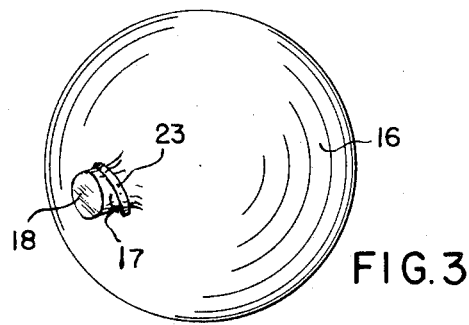
FIG. 3 is an elevational view of a flavor container.

Referring to the drawings, a flavor material injecting device 5 is shown which comprises an elongated needlelike shank 6 which is adapted to be inserted into a body of food for infusing a liquid flavoring medium therein. The shank 6 has a bore 7 extending therethrough and is tapered from a stock end to a sharp point at 9. The stock has finger grip abutments 10, 11 which project from opposite sides of the shank 6. The abutment 10 has a curved forwardly facing surface 12 and a rearwardly facing concave end surface 13. The finger abutment 11 is in the form of a loop having an opening 14 through which a finger of the hand supporting the device may be extended.

The flavoring material to be injected into the food through the shank 6 is contained in a deformable bulb 16 attached to the stock of the shank in a manner to form part of a handle structure for manipulating the shank. The bulb 16 is of a size that it may be engaged by the palm of a hand gripping the abutments 10, 11 by several fingers, and the flavoring material is squeezed from the bulb and through the shank 6 by a gripping action of the hand as the shank is gradually withdrawn from a deep insertion into the food.

In the form shown the bulb 16 is spherical and has a neck 17 formed on one side. The neck 17 provides access to the interior of the bulb for filling and emptying the bulb of flavoring material. The bulb 16 is formed of a resilient and deformable material, such as polyethylene, and after the bulb is filled with flavoring material the neck is sealed by a frangible membrane 18. It is contemplated that the bulb 16 will be disposed of after it is once emptied and that it will be replaced by like bulbs which may have the same or different flavoring agents therein, according to the desires of the user.

The neck 17 is adapted to be received in a socket 20 protruding from the end surface 13 and coaxial with the bore 7. A puncturing stem 22 projects from the surface 13 inside the socket 20 and forms an extension of the bore 7. The outer end of the stem 22 is pointed and pierces the membrane 18 closing the neck 17 when the neck is inserted into the socket. The stem 22 forms a fluid connection between the interior of the bulb 16 and the bore 7.

The neck 17 is secured in the socket 20 by a spiral thread 23 formed in the outside of the neck and which is received in a spiral groove 24 formed in the inside of the socket. The neck 17 is readily attached and detached from the socket by turning the bulb 16 one direction or the other. Thus, bulbs like the bulb 16 can be conveniently attached to and removed from the shank 6.

In use, the shank 6 is inserted as deeply as desired into a body of food to be flavored, such as a meat roast. This is accomplished by pressing on the abutments 10, 11 which afford convenient handling surfaces. The bulb 16 may be attached in the socket 20 before or after insertion of the shank 6 into the food. The shank 6 is then withdrawn slowly from the food by partially cupping the palm of the hand about the bulb 16 and extending the index and first fingers against the abutments 10, 11, as is illustrated by broken lines in FIG. 1. Alternatively, the thumb could be inserted between the bulb 16 and abutment surface 13 with the index finger through the loop opening 14 of abutment 11. In either case, the palm of the hand is gradually pressed against the outer side of the bulb 16 by a gripping action of the hand which expresses the flavoring material from the bulb and through the shank 6 into the food. The location of the finger grips 10, 11 and the bulb 16 on the stock of the shank 6 affords a comfortable handling of the device 5 as well as a convenient and accurate control of the injection of the flavoring material.

I claim:

1. A flavor injector device comprising an elongated hollow needle, a base formation adjacent one end of said needle and comprising finger grip abutments projecting from opposite sides of said needle and having concave surfaces facing towards the remote end of said needle, a bulblike container for liquid flavoring material or the like and means for attaching said container to said base formation in a position in which said container extends outwardly from said base end of said needle, said container being of a size to be engaged by the palm of a hand gripping said finger grip abutments and formed of a resilient material readily collapsed by pressure of a hand gripping said finger grip abutments, said means for attaching said container to said base formation comprising a tubular neck extending from one side of said container and a cylindrical socket in said base formation extending coaxial with the axis of said needle and adapted to receive said neck, and a tubular piercing member extending from the inner end of said socket and coaxial with said socket, said piercing member forming an extension of said hollow needle adapted to project into the neck of said container, the projecting end of said piercing member having a cutting edge for piercing a membrane adapted to close the neck of said container when said neck is inserted into said socket, and means to retain said neck in said socket.